United States Patent

[11] 3,604,366

| [72] | Inventor | Earl K. Jarrett<br>Corpus Christi, Tex. |
|---|---|---|
| [21] | Appl. No. | 771,744 |
| [22] | Filed | Oct. 30, 1968 |
| [45] | Patented | Sept. 14, 1971 |
| [73] | Assignee | Clayton Specialties, Inc.<br>Corpus Christi, Tex. |

[54] MACHINE FOR FORMING BAKERY PRODUCTS
30 Claims, 16 Drawing Figs.

[52] U.S. Cl. ................................................ 107/68,
107/9, 107/54
[51] Int. Cl. ........................................... A21c 11/12
[50] Field of Search ............................. 107/68, 1,
4, 8, 9, 15, 54, 55, 56, 57; 198/19; 83/202–213

[56] References Cited
UNITED STATES PATENTS

| 760,827 | 5/1904 | Vicars et al. .................. | 107/68 |
| 1,150,655 | 8/1915 | Bertram ....................... | 107/9 (.7) |
| 2,193,382 | 3/1940 | Rubel ........................... | 107/4 (.3) |
| 2,573,100 | 10/1951 | Haecks ......................... | 107/4 X |
| 2,781,732 | 2/1957 | Lenherr ........................ | 107/4 (.3) |

FOREIGN PATENTS

| 147,515 | 11/1936 | Austria ......................... | 107/8 (.9) |

*Primary Examiner*—William I. Price
*Assistant Examiner*—Arthur O. Henderson
*Attorneys*—Arnold, Roylance, Kruger & Durkee, Tom Arnold, Donald C. Roylance, Walter Kruger, Bill Durkee and Frank M. Springs ABSTRACT: In one exemplary form, a machine for forming pan-carried dough pieces to produce bakery products of a desired form and shape. The machine includes an elongated frame structure mounting a conveyor means for transporting the pans carrying the dough pieces, an array of forming dies mounted above the conveyor means, a means of lifting the pan-carried dough pieces out of engagement with the conveyor means and into forming and shaping contact with the array of overhead forming dies and a trigger assembly for actuating the lifting means when the pan-carried dough pieces are properly aligned beneath the array of forming dies.

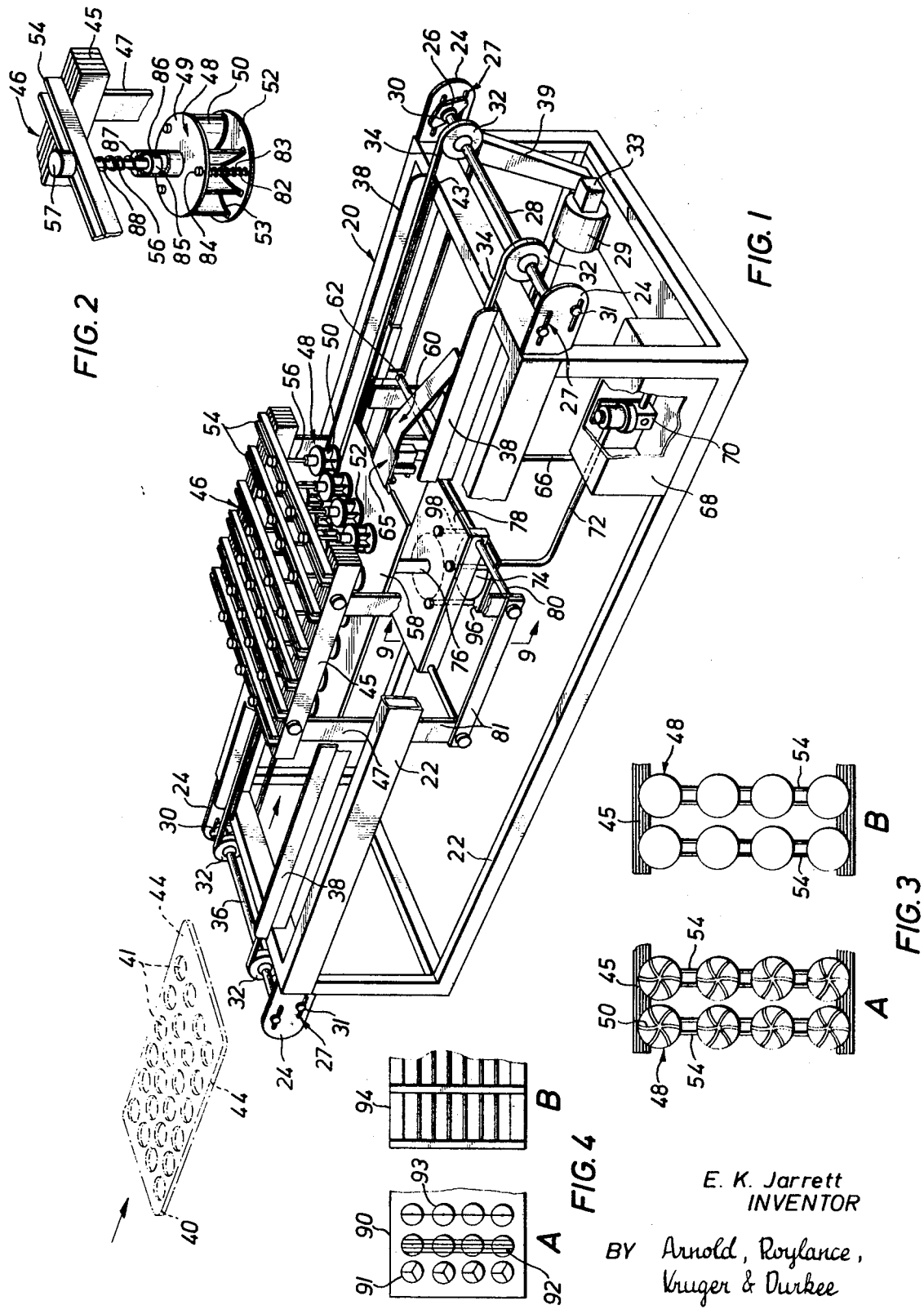

E. K. Jarrett
INVENTOR

BY Arnold, Roylance,
Kruger & Durkee
ATTORNEYS

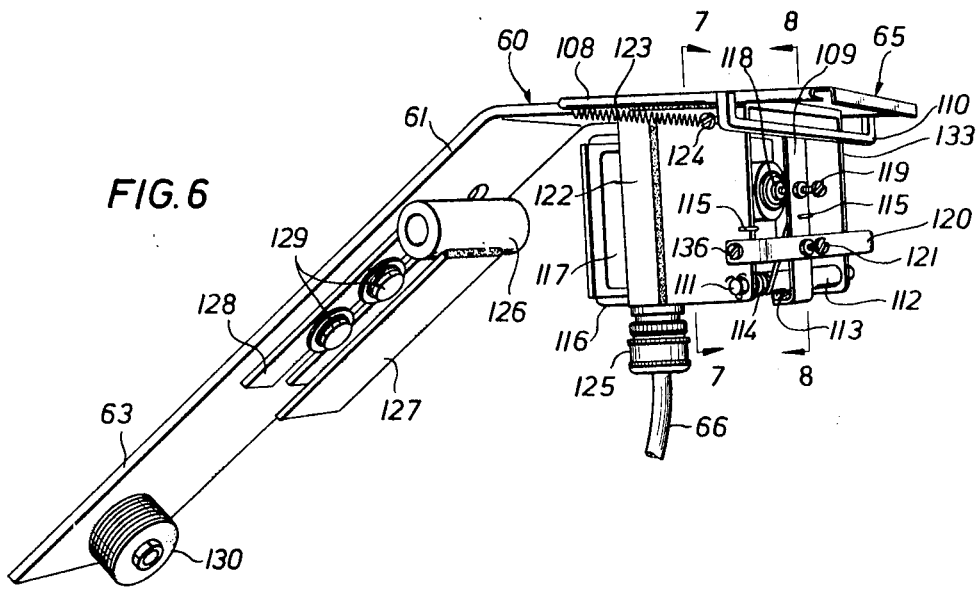

MACHINE FOR FORMING BAKERY PRODUCTS

BACKGROUND OF THE INVENTION

This invention relates to a novel and useful machine for forming various bakery products, and more particularly to a machine for forming and shaping individual pan-carried dough pieces of various bakery products.

In the process of making bakery products of varying shapes and designs, such as "Kaiser" rolls, cloverleaf, two-part and five-part flaky rolls and pull-apart bread, a plurality of pieces of dough are placed on a flat pan or in each section of a multisection pan. Then the dough pieces are properly formed either by hand or by using a special forming die, having shaped blades and cutters to give each dough piece its final desired shape and design.

Heretofore, it has been common to form the dough pieces individually by hand using a knife or an appropriate stamping or cutting die. Another way to form all the dough pieces of a multisection pan has been to place the pan in a machine having an array of forming dies corresponding to the number of dough pieces on the pan, and then lower the dies into forming contact with the dough pieces for forming and shaping. The manual method of individually shaping each dough piece requires considerable time and hence cost, and it is subject to the sanitation problem inherent in such manual processes. The technique of placing the pan into a machine and lowering the dies into contact with the dough pieces to form and shape the pieces is faster and more sanitary. However, it is not conducive to a mass production system necessary in a large bakery where it is necessary to keep hundreds of pans of dough pieces moving continuously along conveyor systems from the point where the dough is mixed to the ovens for final baking. Such a technique of lowering the dies to form the dough pieces requires that the pan carrying the dough pieces be held stationary during the forming process. This results in the need of a continuous "start-stop" conveyors operation with resulting lower efficiency and a shorter expected life of major drive components.

The present invention remedies the problems of the prior art systems for forming and shaping dough pieces for bakery products by utilizing conveyor-transported pan-carried dough pieces and lifting the pan out of the conveyor system and pressing the dough pieces into shaping dies and then returning the pans to the conveyor system to be transported to another station in the baking process.

SUMMARY OF THE INVENTION

The instant invention provides a novel machine for forming cutting, stamping or flattening pan-carried dough pieces to produce bakery products of varying shapes and designs. The machine has a box-type frame of rectangular design, and mounts a conveyor system for moving the pans laterally across the top surface of the frame. The conveyor system consists of a driven pair of spaced conveyor belts located as to carry the pans by their outer edges, thereby leaving the large central area of the bottom of the pan exposed. The means for lifting the pan from engagement with the conveyor is a lifting plate that engages the bottom of the pan and lifts the pan upwardly. The lifting plate is raised and lowered by the action of a piston shaft of a lift cylinder or other suitable mechanical means.

The lift cylinder is actuated by a pan-operated trigger assembly, which is engaged when the pan carrying the dough pieces is in the proper position under the forming dies. A frame assembly centrally located on the box frame of the machine extends upwardly above the conveyor system and traverses the machine frame for holding an array of forming dies in a position directly over the space between the conveyor belts and the lifting plate.

As hereinbefore mentioned, when the pan-carried dough pieces are in the proper position below the array of forming dies, the pan engages the trigger assembly which actuates the lift cylinder, raising the lift plate upwardly until it contacts the bottom of the pan and lifts the pan upwardly into intimate forming and shaping contact with the array of forming dies. The array of dies is adapted to provide a die for each dough piece carried by a pan and to cut all of the dough pieces on the pan in one operation. The forming dies are equipped with spring loaded stripper bars which insure the removal of dough scraps from the cutting blades of the die and prevent sticking of the blades and the accumulation of dough scraps on the head of the forming die.

After forming and shaping the dough pieces, the lift cylinder lowers the pan back into the engagement with conveyor system, thus allowing the formed pan-carried dough pieces to resume transportation via the conveyor to the next processing station in the production of the finished bakery products.

The next pan transported by the conveyor system strikes the actuator trigger and the process is continuously and automatically repeated as long as the pans carrying the dough pieces are transported by the conveyor system.

Accordingly, one feature of the present invention is to provide a machine for lifting pan-carried dough pieces out of a continuously operated conveyor system into forming and shaping contact with an overhead stationary array of forming dies.

Another feature of the present invention is to provide an array of stationary forming dies to simultaneously cut, shape, form, stamp or flatten pan-carried dough pieces by pressing the entire pan of dough pieces into forming contact with the array of forming dies in one operation.

Yet another feature of the present invention is to provide individual forming dies that are equipped with slotted, spring-actuated stripper bars which move freely over the die blades and prevent dough scraps from adhering to the die blades after each forming operation.

Another feature of the present invention is to provide spring-loaded mounting of individual forming dies to enable the dies to form and shape individual dough pieces while maintaining an even cutting or stamping pressure on each dough piece regardless of whether the pan is bent or warped.

Yet another feature of the present invention is to provide a pan-operated trigger mechanism for actuating the lifting device that raises the pan-carried dough pieces into forming contact contact with the forming dies.

Another feature of the present invention is to provide a means of bypassing the pan-operated trigger mechanism to allow utilization of the conveyor system of the forming machine when the forming and shaping operation is not desired.

BRIEF DESCRIPTION OF THE DRAWINGS

In order that the manner in which above-recited advantages and features are attained, as well as others which will become apparent, can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope, for the invention may admit to further equally effective embodiments.

In the drawings:

FIG. 1 is a perspective view, partly in cross section, of the machine for forming bakery products according to the present invention, showing the conveyor system, the forming dies, the pan actuated trigger and the lift cylinder and plate.

FIG. 2 is an enlarged perspective view of a typical forming die.

FIG. 3A is a plan view of a portion of the forming die array showing the type of forming dies utilized in shaping "Kaiser" rolls.

FIG. 3B is a partial plan view of a forming die array utilizing forming dies for shaping and flattening a variety of round rolls.

FIG. 4A is a partial plan view of another type of forming die array utilized in shaping cloverleaf, two-part and five-part rolls.

FIG. 4B is a partial plan view of an array of forming dies utilized in shaping and cutting dough pieces to be baked into pull-apart bread.

FIG. 6 is a perspective view of the pan-operated trigger mechanism utilized for actuating the lift cylinder.

FIG. 7 is a detailed longitudinal vertical cross-sectional view of the trigger assembly of the actuator trigger mechanism.

FIG. 8 is a detailed transverse vertical cross-sectional view of the trigger assembly of the actuator trigger mechanism.

DETAILED DESCRIPTION OF THE PREFERRED EMBODIMENTS

Figure 5:
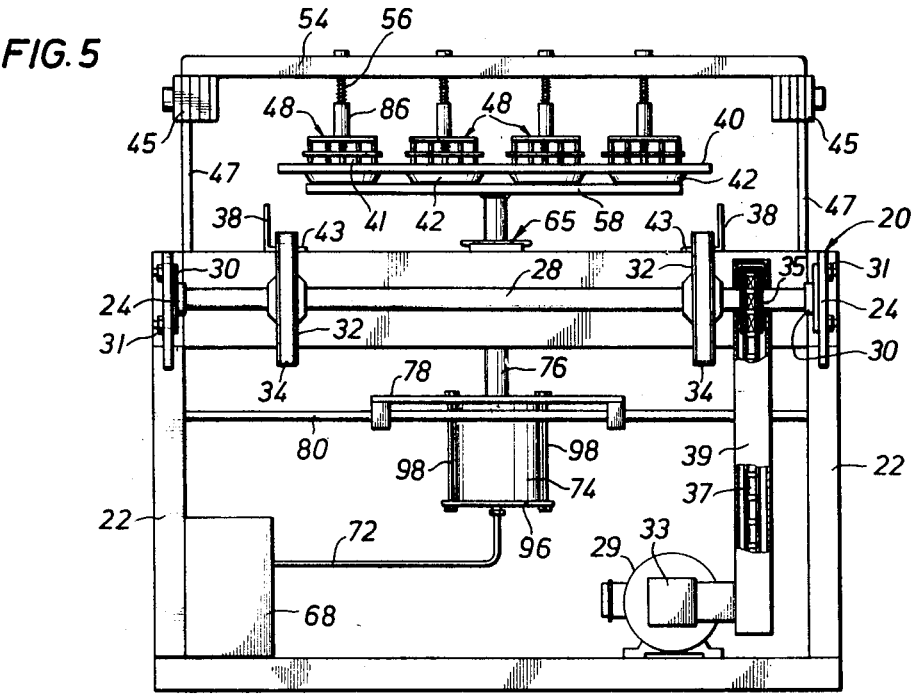
FIG. 5 is an end view of the machine for forming bakery products showing the lift cylinder in its actuated position and pressing the pan-carried dough pieces into forming contact with the stationary array of forming dies.

Referring now to FIGS. 1 and 5, the machine for forming bakery products according to the present invention is shown. The forming machine 20 has an elongated box-type frame structure 22 that may be constructed of any suitable material, such as stainless steel or aluminum. Attached at each longitudinal end of the elongated frame structure 22 are a pair of spaced longitudinally extending plates 24 adjacent the topmost edge of frame structure 22. At one end of frame structure 22 and between one pair of the extensions 24 is disposed a drive shaft 28 having attached thereto a pair of spaced rollers 32. Drive shaft 28 is rotatably mounted between extensions 24 by means of bearings 26 and mounting brackets 30. The mounting brackets 30 are attached to extensions 24 by means of conventional mounting hardware 31 such as bolts and retaining nuts.

Similarly, a pair of extensions 24 are mounted on the other end of the elongated frame structure 22 opposite the end carrying drive shaft 28. An idler shaft 36 is disposed between the second pair of extensions 24 and has attached thereto a pair of spaced rollers 32 identical to those on drive shaft 28. Idler shaft 36 is suitably attached to extensions 24 in a manner identical to drive shaft 28, by means of mounting brackets 30 and suitable mounting hardware 31. Horizontal slots 27 are disposed in extensions 24 to provide a means of longitudinal adjustment of both drive shaft 28 and idler shaft 36.

Longitudinally disposed the length of the top portion of frame structure 22 are two support members 38 having an L-shaped cross section. The support members 38 are disposed in a spaced facing relationship so that one extending flange 43 of each of the support members 38 is facing horizontally inwardly toward the longitudinal centerline of the top of the frame structure 22. Each horizontal flange portion 43 is in alignment with one of the pairs of rollers 32 disposed on drive shaft 28 and one of the pairs of rollers 32 disposed on idler shaft 36 at opposite ends of machine 20. Conveyor belts 34 pass the longitudinal length of support members 38 and are supported by the horizontally extending flanges 43, and pass over the aligned rollers 32 positioned at opposite ends of machine 20 on the drive shaft 28 and idler shaft 36.

An electric motor 29 operating through gearbox 33 provides rotary motion to drive shaft 28 by means of a drive sprocket (not shown) at the output of gearbox 33 and a chain 37 (FIG. 5) cover 39 for engaging a drive sprocket 35 attached to drive shaft 28. As drive shaft 28 is rotated, the conveyor belts 34 are frictionally engaged by rollers 32 thus imparting rotary motion to the conveyor belts 34, causing them to pass longitudinally over the horizontally extending flanges 43 of support members 38 in the direction shown by the arrows in FIG. 1.

A pan 40, carrying individual dough pieces 41, is shown just prior to being placed onto the twin conveyor belts 34 with the lower surface of the flanged edges 44 in engaging contact with the conveyor belts 34. The upright flanges of the parallel support members 38 are spaced to allow pan 40 to pass freely between them and act as guides to prevent the pan from slipping sideways after it is engaged by the conveyor belts 34.

Attached centrally to the frame structure 22 of machine 20 is a forming die supporting framework 46 composed of vertical support members 47 attached to the side rails of structure 22, and horizontal support rails 45 connected between a pair of vertical supports 47 on each side of frame 22. Disposed transversely across the top of the horizontal support members 45 are a series of parallel mounting bars 54 which are suitably attached at each end to opposite support members 45.

Forming dies 48 depend from the transverse mounting bars 54 and are suitably attached thereto, as will be hereinafter explained, by means of a shaft 56. As shown in FIG. 2, each forming die has a die head having blades 50 and a stripping plate 52 for stripping away dough fragments from the die blades after the dough pieces have been formed and shaped. The array of forming dies depending from the transverse series of mounting bars 54 is spaced above the conveyor system and centered between conveyor belts 34, allowing pans 40 to pass directly beneath the forming die array.

Horizontally disposed between the conveyor belts 34, and directly below the array of forming dies 48, is a rectangular lifting plate 58. Plate 58 lies in a plane below the level of conveyor belts to allow pan 40 to pass freely over the lifting plate as the pan is transported.

An actuator trigger mechanism 60 is shown disposed centrally between the two conveyor belts 34 with the trigger assembly 65 disposed adjacent lifting plate 58 and projecting horizontally into the path of an oncoming pan 40. The actuator trigger mechanism 60 is pivotally mounted on a shaft 62 for purposes that will be hereinafter described. When the pan 40 engages trigger assembly 65 (as will be hereinafter explained in greater detail) an electrical control signal is generated and transmitted via cable 66 to a control circuit (not shown) that controls a solenoid-actuated valve 70, shown located within electrical control box 68. Upon receiving an electrical control signal, two-way valve 70 is operated and permits pressurized air from an external source to flow through tubing 72 into cylinder 74. The pressurized air causes cylinder piston 76 with the attached lifting plate 58 to rise and contact the bottom of pan 40 and lift the pan upwardly into forming and shaping contact with the array of forming dies 48.

After the dough pieces carried by pan 40 have been pressed into forming contact with dies 48, the control circuit operates valve 70 to its "open" position and allows the pressurized air with cylinder 74 to be exhausted via tubing 72. As the pressurized air is exhausted, piston rod 76 lowers lifting plate 58 to its original position and redeposits the flanged pan 40 into contact with the continuously moving spaced conveyor belts 34.

Cylinder 74 is shown supported by a lower mounting plate 96 that is secured to an upper mounting plate 78 by means of conventional bolts and hardware 98. Upper plate 78 is supported by means of two transverse rods 80 suspended below the top level of frame structure 22 by means of support members 81.

The cylinder 74 is utilized in the forming machine 20 according to the present invention is preferably a pneumatically operated cylinder, however, a hydraulically operated cylinder or any other mechanical means for accomplishing the raising and lowering of the lifting plate in response to the pan-actuated trigger mechanism 60 may conveniently be utilized.

In FIG. 2, an enlarged perspective view of a typical forming die 48 is shown, with a fragmentary portion of the support structure 46. Forming die 48 comprises a circular upper plate 49 having attached thereto die blades or cutters 50 that extend perpendicularly outward from the face of plate 49. Stripper plate 52 is slotted or otherwise formed to accommodate extending blades 50 and has attached to its upper surface spaced guide rods 83 extending perpendicularly to the upper surface. The purpose of stripper plate 52 is to scrape off and remove excess bits of dough that have stuck to the forming die blades 50 after each forming operation. This prevents scraps of dough from filling and packing around the blades 50 and ultimately interfering with the forming and shaping of the dough pieces.

Stripper plate 52 is supported in a manner that will allow it to move upwardly as the outer circular edge of the lower surface of the plate contacts the surface of pan 40 (see FIG. 1) adjacent the rim of each dough cup and thereby expose the blades 50 for forming and shaping the dough piece. When the dough piece and pan 40 are lowered out of contact with the forming die, stripper plate 52 is urged downwardly to its original position, thus stripping away the excess dough attached to blades 50.

Guide rods 83 support stripper plate 52 and control its upward and downward motion. One end of each of the rods 83 is inserted through apertures in the upper die plate 49, coaxially through a compression spring 82 and are then suitably fixed to the upper surface of stripper plate 52. The other end of the guide rod 83 has an enlarged head for preventing the rod from moving completely through the aperture in plate 49 and for supporting the stripper plate 52 when it returns to its lowermost position. Guide rod 83 may be threaded and the top surface of plate 52 tapped for removable attachment of the guide rods or the ends of rods 83 may be brazed, welded or attached in any other suitably fashion to the top surface plate 52.

In operation, as the pan 40 carrying the dough pieces is raised upwardly and contacts the lower surface of plate 52, the plate is raised upwardly against the downward force exerted by the compression springs 82 causing guide rods 83 to move upwardly through the apertures in die plate 49. When pan 40 is lowered, the compressed springs 82 exert a downward force on the top surface of plate 52 thereby forcing the stripper plate downward to strip excess dough from the blades 50. When plate 52 is in its original position it is supported by heads 84 of guide rods 83 contacting the upper surface of plate 49.

Forming die 48 may be attached to the die supporting structure 46 in any suitable manner, preferably by means of a shaft 56 one end of which is fixed to the die upper plate 49 and the other end of which is fixed to a mounting bar 54. It has been found advantageous, however, to provide a means of allowing the entire head of the forming die 48 to move vertically in response to the pressure exerted by the dough pieces and the pan to compensate for the unevenness of many pans that have become bent or warped after long usage. Such a feature will allow the individual forming dies 48 to move vertically to conform to the configuration of such a bent or warped pan, thereby providing an even forming or stamping pressure to each individual dough piece.

To provide for such vertical movement of a forming die 48, the structure shown in FIG. 2 has been utilized. A cylindrical sleeve 86 is shown having an inwardly projecting flanged rim 87. Die shaft 56 having an enlarged cylindrical head 85 is inserted through sleeve 86 until head 85 engages the lower surface of rim 87. The outer surface of head 85 bears against the inner cylindrical walls of sleeve 86 and is free to move axially with respect thereto, however, the inwardly projecting flanged rim 87 limits the upward movement of projecting head 85.

The lower open end of sleeve 86 is suitably attached to the upper forming die plate 49 by brazing or welding the metal pieces together. The other end of shaft 56 is removably attached to a transverse mounting bar 54 by any conventional means that will allow the die shaft to be removed, yet will hold the shaft firmly in a fixed stationary position. A spring 88 is disposed coaxially around shaft 56 between mounting bar 54 and the rim 87 of sleeve 86 to urge the head of die 48 downwardly on shaft 56.

As the dough pieces are pressed upwardly against the forming dies 48, the die cutting blades 50 will cut through the dough pieces and strike the surface of the pans, and as the upward lifting force continues the pans will force the head of the forming dies 48 upwardly, causing sleeve 86 to slide upwardly over head 85 of shaft 56 and compressing spring 88. It may be seen, that is a pan is bent or warped, various forming die heads 48 will be pushed upwardly in varying amounts to accommodate the bent or warped pan. When the pan with the dough pieces is lowered, the force of the compressed spring 88 exerted downwardly against the flanged rim of sleeve 86 then urges the forming die head back into its original extended position to be ready for the next forming operation.

The forming die 48 shown in FIG. 2 is designed to shape the "pin wheel" effect on the surface of a "Kaiser" roll as may be seen more clearly in the plan view of a portion of an array of forming dies shown in FIG. 3A. Of course, any other desired types of forming dies may be utilized as shown in FIGS. 3B, 4A and 4B.

In FIG. 3B, the forming dies 48 that are shown provide only a circular shaped cutting blade to form the dough pieces and flatten them into circular bun shapes. In FIGS. 4A and 4B, other forming die arrays are shown that may be utilized to provide a variety of bakery products. The forming dies 91 form cloverleaf rolls while forming dies 92 and 93 form five-part and two-part rolls, respectively. The multisection die 94 is used to form and shape pull-apart bread.

Referring specifically to FIG. 5, an end view of the forming machine 20 is shown. The lift cylinder 74 is shown in its actuated position and pressing the pan-carried dough pieces 41 into forming contact with the array of forming dies 48. Conveyor belts 34 engage the slotted outer rim of rollers 32 and are supported over the length of the flanges 43 of supporting members 38.

Lifting plate 58 is centrally attached to the cylinder piston rod 76 and is shown in its maximum lifted position. Plate 58 is shown supporting a pan 40 having multiple sections or cups 42 holding individual dough pieces 41 in forming and shaping contact with the forming dies 48. Forming dies 48 are attached to and supported by mounting bars 54 which are in turn supported by structural frame members 45 and 47 as hereinbefore described. Dies 48 are capable of vertical displacement by means of the displacement of sleeve 86 vertically with respect to shaft 56 as hereinbefore described. Trigger assembly 65 is shown centrally located between the conveyor belts 34 and positioned as to so intercept the downwardly projecting cups 42 of pan 40.

The actuator trigger mechanism 60 is shown in a perspective view in FIG. 6, and is an improvement of the control switch assembly disclosed and claimed in U.S. Pat. No. 3,242,278 to C. T. Walters entitled "Control Switch Assembly for Moving Articles of the Like." Actuator trigger mechanism 60 comprises a V-shaped bar 61 having a short arm and a longer extending arm 63. Attached to the shorter arm of actuator bar 61 is a trigger assembly 65. The actuator trigger mechanism 60 is attached to frame structure 22 by means of a pivot bar 62 (see FIG. 1) which is inserted through a sleeve 126 fixed to the end of a slotted adjustable mounting bar 128. Slotted bar 128 is removably attached to the lower surface of actuator bar 61 by any conventional removable attaching means, preferably bolts 129. Pivot sleeve mounting bar 128 has a longitudinal slot to allow the bar to be displaced longitudinally with respect to arm 63 in order to facilitate the adjustment of the location of the sleeve 126 for reasons to be hereinafter explained. Attached adjacent the end of the longer actuator bar arm 63 is a weight 130 for a purpose to be hereinafter explained.

When mounted in machine 20, the shorter arm of bar 61 is adjusted to a substantially horizontal attitude by means of adjusting the location of sleeve 126 with respect to arm 63 of bar 61 to adjust the pivot point of actuator trigger mechanism 60. This adjustment is accomplished by loosening restraining bolts 129 and adjusting the position of the slotted bar 128 until the rotational moment acting on the longer arm 63 of bar 61, including weight 130, balances the rotational moment acting on the shorter arm of bar 61, i.e., primarily the weight of trigger assembly 65, and causes the shorter arm to assume a substantially horizontal attitude. An elongated plate 127 is also attached to the outer surface of sleeve 126 parallel to slotted bar 128 for purposes that will be hereinafter described.

Referring now to FIGS. 6, 7 and 8, the trigger assembly 65 is shown in detail. The shorter arm of bar 61 has an extending narrow metal strip welded to each outer edge, the top surface of the strips being flush with the top surface of the shorter end of bar 61 to form horizontally extending rails 134. Also welded to the edges of the shorter arm of bar 61 and perpendicular thereto are side mounting plates 122 and 133. A switch 116 in housing 117 is attached to the inside surface of mounting plate 122.

A slide plate 108 has downwardly and inwardly rolled longitudinally edges 132 that engage the extending rails 134 and allow the slide plate 108 longitudinal movement with respect to the shorter arm of bar 61. The end of slide plate 108 adjacent the end of bar 61 is bent downwardly to provide a projecting lip 137 that engages the outer end of bar 61 and stops the rearward displacement of the slide plate.

On the end of slide plate 108 opposite lip 137, the rolled edges 132 are crimped (not shown) to engage the rear edges of extending rails 134 and limit the forward displacement of slide plate 108. Of course, any other convenient means of providing a stop for the forward displacement of slide plate 108 may be utilized. Springs 123 are attached to each side of plate 108 adjacent the crimped ends of the rolled edges 132 and to the outside of side mounting plates 122 and 133 by screws 124 to urge the slide plate 108 forward against the previously mentioned crimped ends of edges 132.

Disposed transversely between the forward lower edges of side mounting plates 122 and 133 is a shaft 111 that passes through apertures in each sideplate and is removably retained by any conventional means such as a cotter pin. Coaxially disposed over a portion of shaft 111 is a sleeve 112. Spaced adjacent to sleeve 112 and coaxially disposed over the remaining portions of a shaft 111 is a coiled spring 114. An arm 109 is brazed or welded at 113 to the outer surface of sleeve 112 for pivotal movement about shaft 111 parallel to the inner surfaces of sideplates 122 and 133. The elongated ends 115 of spring 114 are attached to the forward edge of sideplate 122 and one edge of arm 109 to apply a forward rotational bias to arm 109. As previously mentioned, switch 116 is mounted between plates 122 and 133 with its actuating plunger 118 projecting forward of the leading edges of side mounting plates 122 and 133. One end of arm 109 is attached to sleeve 112 so that arm 109 is in centered alignment with plunger 118. A striker 119 is disposed in arm 109 to axially contact plunger 118 when arm 109 is pivoted rearwardly. Striker 119 is shown as a screw projecting through arm 109, however, any suitably adjustable striking means may be utilized.

The extending arms of a U-shaped member 120 are attached by means of screws 136 to opposite side mounting plates 122 and 133 to form a bracket extending transversely across the forward edges of plates 122 and 133. Bracket 120 functions as a mounting support for an adjusting screw 121 that contacts the outer surface of bar 109 and limits the outward rotational movement urged by spring 114. Screw 121 may be adjusted to properly position arm 109 and striker 119 in spaced relation to switch plunger 118.

Another U-shaped bar 110 is fixed to the upper free end of striker arm 109 with the extending arms of bar 110 oriented upwardly in a plane parallel to the plane defined by arm 109. The extending arm of crossbar 110 extend upwardly adjacent the rolled edges 132 of slide plate 108. Pan 40 makes moving physical contact with crossarm 110 to rotate bar 109 and striker 119 into switch actuating contact with plunger 118 of switch 116 as will be hereinafter described in detail.

Figure 9:
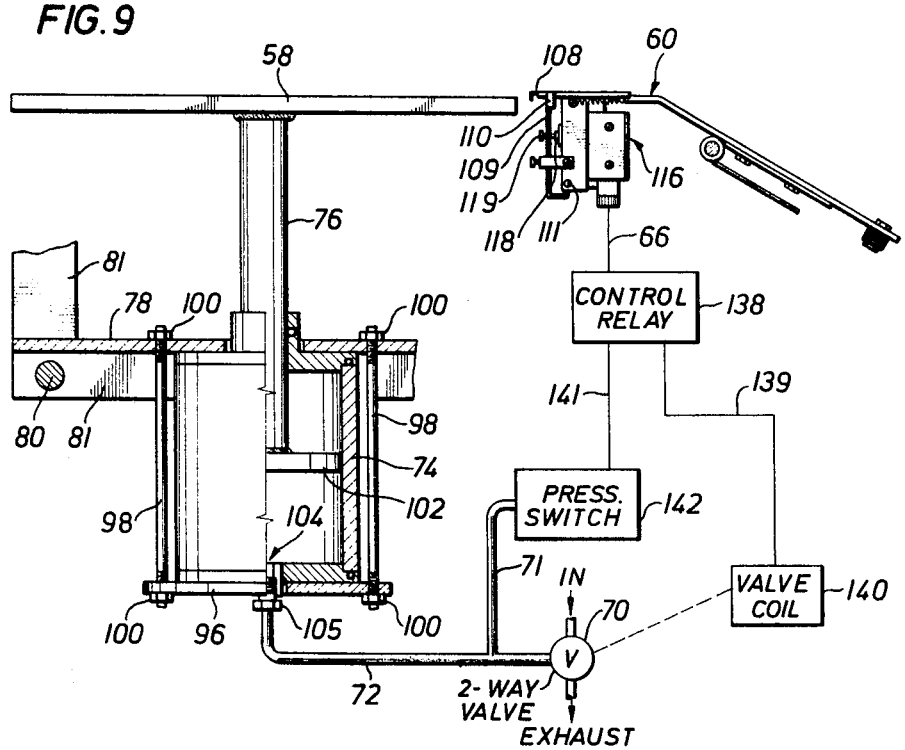
FIG. 9 is a simplified schematic diagram of the lifting mechanism and its control system, showing the lift cylinder partially in section, the actuator trigger mechanism, and the basic circuit for controlling the operation of the lift cylinder.

Referring now to FIG. 9, a simplified schematic diagram of the actuating circuit for controlling the operation of the lift cylinder 74 and a partial vertical cross section of the lift cylinder 74 are shown. The actuator trigger mechanism 60 is shown positioned adjacent one edge of lifting plate 58. Trigger actuator mechanism 60 is positioned so that the top surface of slide plate 108 lies in a plane substantially parallel to the horizontal top surface of lift plate 58.

Lift plate 58 is supported by shaft 76 attached to a piston head 102 disposed within the pneumatic cylinder 74, having a conventional structure and means for sealing the outer body of the cylinder. A fitting 105 is connected centrally through the base of cylinder 74 to communicate with the air inlet port 104 of cylinder 74. Pressurized air is applied through tubing 72, filling 105 and inlet port 104 into the chamber of cylinder 74 for acting against the piston head 102 and raising shaft 76 and lifting plate 58.

The cylinder 74 is shown supported by a lower plate 96 attached by means of long threaded bolts 98 and nuts 100 to a mounting plate 78 which in turn carried and supported by supporting members 81 and transverse supporting rods 80, as shown in FIGS. 1 and 5. Of course, it may be seen that any convenient method of supporting cylinder 74 in its upright attitude for vertically displacing lifting plate 58 may be utilized, Tubing 72 is connected to a two-way solenoid-actuated valve 70 which has an inlet port connected to a source of pressurized air and an exhaust port as shown in FIG. 9. Valve coil 140 actuates valve 70 to permit pressurized air to flow from the source into tube 72. A tubing 71 provides pressure communication between a pressure actuated switch 142 and the tubing 72 which applies the pressurized air to cylinder 74.

When a pan strikes crossbar 110 of trigger assembly 65, striker 119 is rotated forward into contact with actuating plunger 118 of switch 116 and closes the switch. When switch 116 closes, an electrical signal is sent via cable 66 to the control relay 138. Control relay 138 applies an electrical current via conductor 139 to energize the valve coil 140 and operate solenoid-actuated valve 70, allowing the pressurized air to be applied through tubing 72, fitting 105 and inlet port 104 into the chamber of cylinder 74. The pressurized air acts against piston head 102, driving the piston shaft and lift plate 58 up to engage the lower surface of the pan carrying the dough pieces. The lift plate 58 then carries the pan 40 and dough pieces 41 upwardly into forming contact with the array of forming dies 48 as shown in FIG. 5.

When piston head 102 has reached its maximum upward displacement, shaft 76 and lifting plate 58 are fully extended and the pressure of the compressed air within cylinder 74 and tubing 72 will stabilize at a predetermined maximum level. This maximum pressure will be communicated through tubing 71 to pressure switch 142. In response to the predetermined pressure, pressure switch 142 is opened and breaks the holding circuit of control relay 138, and the voltage applied by control relay 138 via conductor 139 to the valve coil 140 is terminated, and the two-way valve 70 returns to its "exhaust" position. The pressurized air within cylinder 74 escapes via port 104, fitting 105 and tubing 72 through valve 70 and is exhausted into the atmosphere. As the air pressure within the chamber of cylinder 74 begins to drop, piston head 102 moves downwardly, lowering shaft 76 and lifting plate 58.

Figure 10:
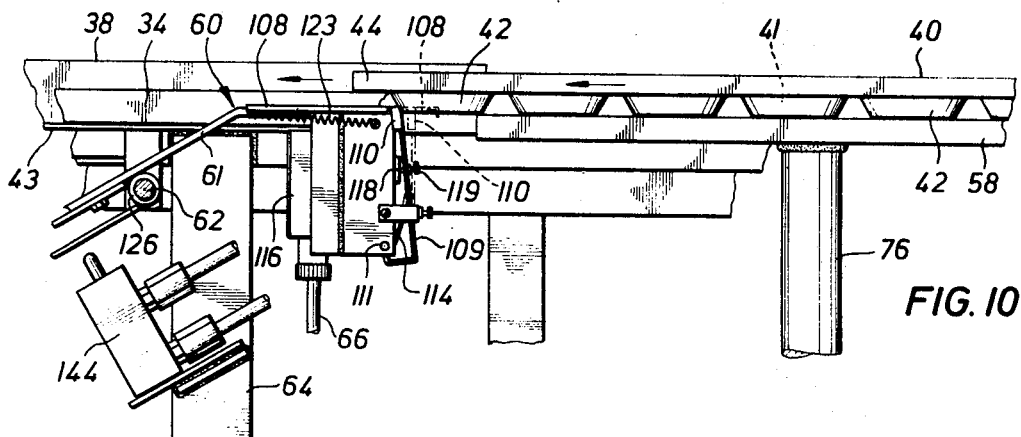
FIG. 10 is a fragmentary side view of a portion of the forming machine, showing a conveyor-transported pan carrying dough pieces positioned over the lifting plate and engaging the actuator trigger mechanism as the first step in the lifting sequence.
Figure 11:
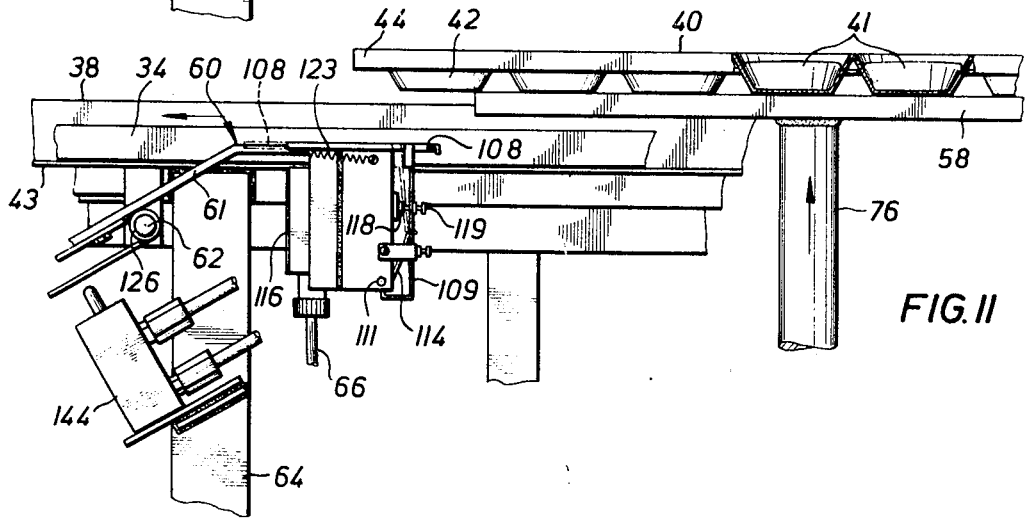
FIG. 11 is a fragmentary side view of a portion of the forming machine showing the pan-carried dough pieces being lifted out of engagement with the conveyor system by the lifting plate.
Figure 12:
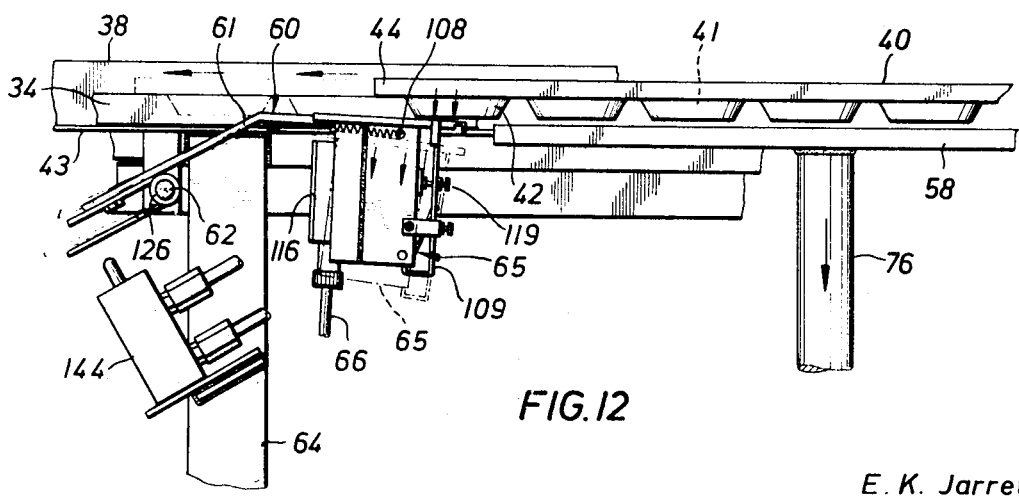
FIG. 12 is a fragmentary side view of a portion of the forming machine showing the lifting plate lowering the pan carrying the dough pieces into engagement with the conveyor.

FIGS. 10, 11 and 12 are fragmentary side elevational views of the machine 20 according to the present invention showing the lift plate 58 and the actuator trigger mechanism 60 during various stages of the raising and lowering sequence. A pan 40 carrying dough pieces 41 is shown being transported by conveyor belt 34 in the direction of the arrows. Belt 34 moves across the upper surface of the extending flange 43 of the supporting member 38. As the pan 40 comes into position beneath the array of forming dies 48 (not shown) the center ones of the leading row of the pan cups 42 strike the lip 137 of side plate 108 causing the plate to move rearwardly and tensioning the spring 123. As the leading cups 42 of pan 40 thrust the slide plate 108 rearwardly, the U-shaped crossbar 110 makes contact with the leading edge of the first cups 42. The moving pan 40 acting against crossbar 110 and arm 109 rotates arm 109 and striker 119 rearward causing the tip of striker 119 to engage the switch actuating plunger 118, depressing the plunger 118 and closing switch 116. The electrical signal generated when switch 116 is closed is applied through cable 66 to the control circuit to actuate cylinder 74 as hereinabove described. A bypass actuator 144, attached to a mounting bracket 64, is shown positioned adjacent to actuator bar 61 for purposes to be hereinafter described.

In FIG. 11, lifting plate 58 has raised the pan-carried individual dough pieces clear of the conveyor belt 34. Biased by the tension spring 123, slide plate 108 is driven forward to its original position from its rearmost position as shown by the dotted lines. Pivoting arm 109 and striker 119 pivot forwardly about shaft pin 111 under the urging of spring 114 to return bar 109 to its normal position. When striker 119 is pivoted forward, the spring loader switch actuator plunger 118 returns to its normal position and opens switch 116.

In FIG. 12, the lift plate 58 supporting pan 40 has returned to its lowered position and pan 40 has been reengaged by the conveyor belts 34. It will be noted in FIG. 10 that the top surface of slide plate 108 is in a plane substantially parallel to but displaced slightly higher than the top surface of lifting plate 58. The top surface of slide plate 108 also lies in a plane displaced higher than the plane described by the bottom surfaces of the pan cups 42 as can be seen in FIGS. 10 and 12. When lift plate 58 is lowered and returns pans 40 to the conveyor belts 34, the bottom surface of the forward pan cups will strike the upper surface of slide plate 108, since slide plate 108 has returned to its original extended position. When pan 40 strikes slide plate 108, the trigger assembly 65 is rotated downwardly about pivot shaft 62 to the position shown by the dotted lines. The downward rotation of the trigger assembly 65 allows the bottom surfaces of the downwardly projecting cups 42 of pan 40 to ride over plate 108 and clear the actuator trigger mechanism 60 and allow pan 40 to continue its movement along conveyor belts 34. After the pan has passed over the now downwardly rotated actuator trigger mechanism 60, the rotational moment exerted by weight 130 and the weight of arm 63 (see FIG. 6) will exert an opposite rotational force on actuator bar 61 and cause the trigger assembly to rotate upwardly and resume its normal position with slide plate 108 in a substantially horizontal position. Trigger actuator mechanism 60 is now disposed to engage the next conveyor-transported pan 40 carrying dough pieces for actuating lift cylinder 74 and lift plate 58.

Figure 13:
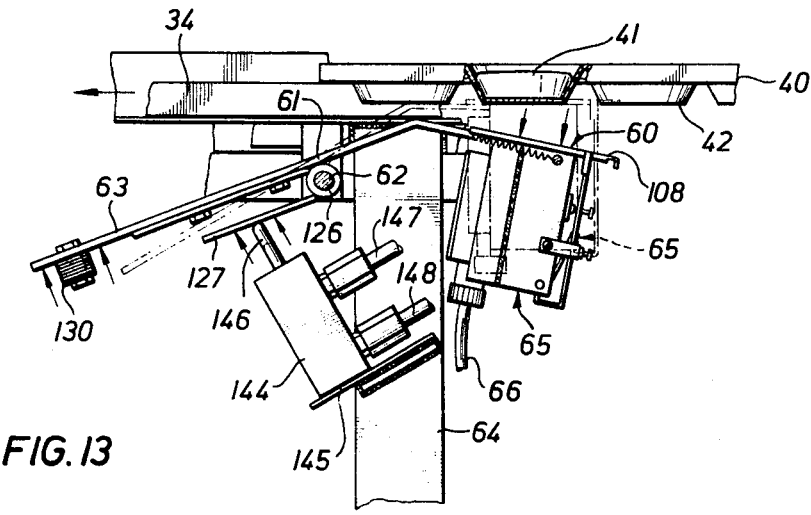
FIG. 13 is a fragmentary side view of a portion of the forming machine showing the operation of the actuator trigger bypass mechanism.

There may be times when it is desirable to utilize the conveyor system of machine 20 but not form or shape the pan-carried dough pieces. In that event, the trigger assembly 65 may be rotated downwardly out of the path of oncoming pans 40 to prevent actuation of cylinder 74 as shown in FIG. 13. A small pneumatic cylinder 144 is attached by means of brackets 64 and 145 so that its piston rod 146 is spaced from and substantially perpendicular to the outer surface of plate 127 attached to sleeve 126 of the actuator trigger mechanism 60. Bypass cylinder 144 may be actuated by using pressurized air, as does the main cylinder 74, or a hydraulically operated cylinder may be used. Of course, any other convenient mechanical means may be utilized to contact bar 127 and rotate trigger assembly 65 downward out of the path of oncoming pans.

Pressurized air is applied into cylinder 144 through tubing 148, driving the piston upwardly and causing the rod 146 to extend and contact the outer surface of the striker bar 127, rotating bar 61 about shaft 62 to displace trigger assembly 65 downwardly out of engaging alignment with the conveyor transported pans 40. With trigger assembly 65 depressed, the pans 40 will pass over the actuator trigger mechanism 60 without actuating the lift cylinder 74.

To return the trigger assembly 65 to its normal operating position, pressurized air is applied into the bypass actuator cylinder 144 through tubing 147 to drive the cylinder piston downwardly and exhaust the pressurized air used for extending rod 146 out through tubing 148. As the piston of cylinder 144 is driven downward, the piston rod 146 is lowered away from contact with striker bar 127, and the actuator trigger mechanism 60 resumes its normal attitude with striker plate 108 of the trigger assembly 65 assuming a substantially horizontal attitude adjacent the edge of lift plate 58.

The bypass mechanism may be manually controlled by the operator of the forming machine 20 or it may be automatically controlled. The bypass mechanism allows forming machine 20 to be utilized as a component in a conveyor system that transports various types of bakery products, some of which may not require the special shaping and forming that is provided by machine 20. When such bakery products are to be transported through the conveyor system, of course, actuator trigger mechanism 60 may be bypassed as hereinabove discussed.

Figure 14:
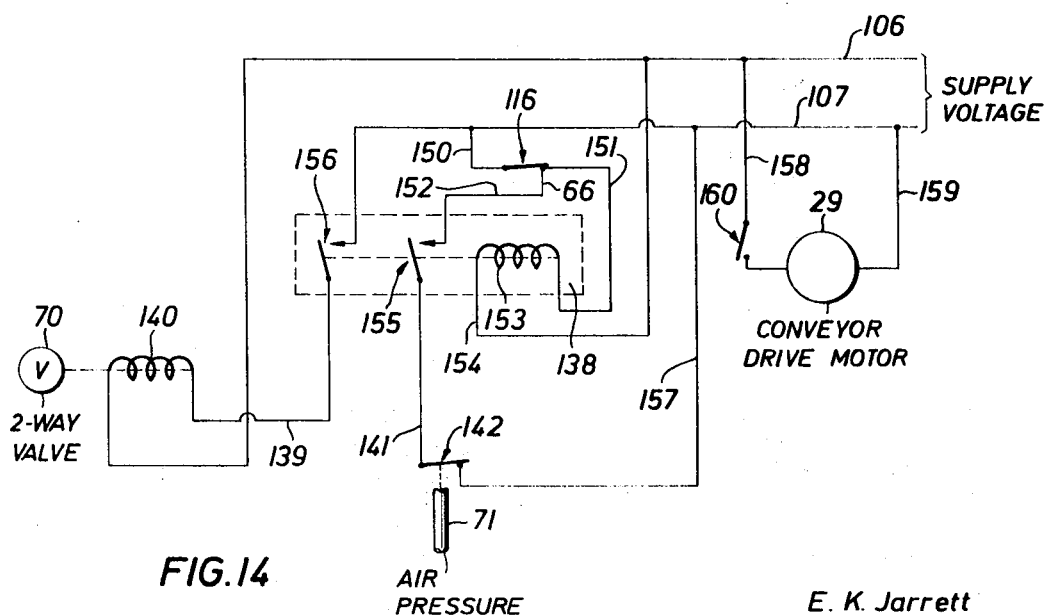
FIG. 14 is an electrical schematic wiring diagram of the forming machine according to the present invention.

An electrical schematic wiring diagram for machine 20 is shown in FIG. 14. Line supply voltage is applied to the machine via conductors 106 and 107. The supply voltage is applied to conveyor drive motor 29 through conductor 158 and switch 160 from line 106, and through conductor 159 from line 107. The supply potential is directly applied to coil 140 of the solenoid-actuated valve 70 through conductor 106. Supply potential is applied through conductor 107 to the trigger switch 116 via conductor 150 and to the air pressure switch 142 through wire 157. Supply voltage is also applied via conductors 106 and 154 to one side of the coil 153 of control relay 138.

Referring now to FIGS. 9–12, and 14, when the leading cups 42 of pan 40 strike crossbar 110 of the trigger assembly 65 and striker 119 contacts plunger 118, trigger switch 116 is closed. With switch 116 closed, supply voltage is applied via conductors 107, 150 and 151 to the other side of coil 153 of control relay 138, thereby energizing relay 138 and closing the normally open relay contacts 155 and 156. With switch 116 closed, supply voltage is also applied via conductors 107, 150 and 152, the closed relay contacts 155 and conductor 141 to the normally closed pressure switch 142.

When relay 138 is energized and movable contact 156 is closed, supply voltage is applied via conductor 107, relay contacts 156 and conductor 139 to the other side of coil 140 thereby energizing coil 140 and opening the two-way valve 70 and allowing pressurized air to be applied through tubing 72 into the chamber of lift cylinder 74. As soon as pan 40 is lifted upwardly out of contact with trigger assembly 65, the striker 119 attached to the bar 109 is pivoted to its original position allowing actuating plunger 118 to disengage and open trigger switch 116. However, as may be seen in FIG. 14, when switch 16 opens, the control relay 138 is held in its energized state by means of energizing voltage applied to coil 153 as traced through conductors 106 and 154, coil 153, conductors 151 and 152, relay contacts 155, conductor 141, switch 142, and conductors 157 and 107. In this way, relay contacts 155 and the air pressure switch 142 complete a holding circuit to maintain relay 138 in its energized state, thereby maintaining coil 140 energized to allow pressurized air to continue to be applied through valve 70 into tubing 72 to the chamber of lift cylinder 74.

As hereinbefore described, when the pressurized air has reached a predetermined pressure in tube 71 and the forming and shaping operation is complete, pressure switch 142 is opened and the holding action of relay 138 is interrupted, deenergizing coils 153 and 140, and causing the two-way valve 70 to return to its "exhaust" position for exhausting the pressurized air from the chamber of lift cylinder 74 out through tubing 72 and valve 70. When coil 140 of valve 70 is deenergized, the pressure of the air in tubing 71 drops as the air from the chamber of lift cylinder 74 is exhausted, and the air pressure switch 142 returns to its normally closed state. When coil 153 of relay 138 is deenergized, contacts 155 and 156 are returned to their normally open state. Control relay 138 will remain deenergized as will coil 140 of the solenoid-actuated valve 70 until the next pan 40 strikes trigger assembly 65 and again closes trigger switch 116 to start the lift cycle.

The forming machine 20 has been described in the context of forming and shaping individual dough pieces carried in elongated pans. However, it may be seen that such a machine utilizing a conveyor system and an overhead array of forming dies may be utilized with pan or tray-carried malleable pieces for forming, stamping, imprinting, shaping or designing such malleable pieces. A single die may be used in place of an array of forming dies in order to stamp or shape such malleable pieces or a single large-area malleable piece.

Numerous variations and modifications may obviously be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. An apparatus for forming pan-carried dough pieces to produce bakery products of varying shape and design, comprising
   an elongated frame structure,
   a pair of spaced conveyor belts adapted for longitudinal movement with respect to said frame structure, each of said belts frictionally engaging the lower surface of opposite edges of the pan,
   continuously driving said belts to move the pans the length of said frame structure,
   forming means positioned above said frame structure and conveyor belts and allowing the conveyor belt transported pans carrying the dough pieces to pass under said forming means,
   lifting means for disengaging the pan from said moving conveyor belts and lifting the dough pieces into intimate contact with said forming means, and
   actuator means disposed within said frame structure for actuating said lifting means when the dough pieces are aligned beneath said forming means.

2. The apparatus as described in claim 1, wherein said means for driving said belts comprises
   a drive shaft disposed transversely to the longitudinal axis of said frame structure and adjacent one of its ends, said shaft adapted for rotational movement and having fixed thereon a pair of spaced rollers,
   each of said spaced rollers supporting and frictionally engaging one of said conveyor belts for imparting motion thereto as said drive shaft and rollers are rotated,
   an idler shaft disposed transversely to the longitudinal axis of said frame structure and adjacent its other end, said idler shaft adapted for rotational movement and having fixed thereon a pair of spaced rollers each of which frictionally engage and support one of said conveyor belts and rotate said idler shaft, and
   means for rotating said drive shaft.

3. The apparatus as described in claim 2, wherein said means for rotating said drive shaft comprises
   a first drive sprocket fixed to said drive shaft,
   motor driven means for rotating a second drive sprocket spaced from said first drive sprocket, and
   a drive chain connecting said first and second drive sprockets for rotating said drive shaft.

4. The apparatus as described in claim 3, wherein said forming means comprises
   a plurality of shaped forming dies, and
   a frame assembly for central attachment to said frame structure for supporting said forming dies in a speed overhead relationship to said conveyor belts.

5. The apparatus as described in claim 4, wherein said lifting means comprises
   a lift cylinder supported within said frame structure and spaced below said frame assembly and forming dies, the piston shaft of said lift cylinder adapted for reciprocal vertical movement between said spaced conveyor belts,
   a lift plate fixed to the end of said lift cylinder piston shaft and adapted to engage the bottom of the pan, and
   a valve responsive to said actuator means for controlling the inflow of fluid into said lift cylinder to raise said lift plate and engaged pan carrying the dough pieces into contact with said forming dies.

6. An apparatus for forming pan-carried dough pieces to produce bakery products of varying shape and design, comprising
   an elongated frame structure,
   a pair of spaced conveyor belts adapted for longitudinal movement with respect to said frame structure, each of said belts frictionally engaging the lower surface of opposite edges of the pan,
   means for driving said belts to move the pans the length of said frame structure,
   forming means positioned above said frame structure and conveyor belts and allowing the conveyor belt transported pans carrying the dough pieces to pass under said forming means,
   lifting means for disengaging the pans from said conveyor belts and lifting the dough pieces into intimate contact with said forming means,
   trigger means supported by said frame structure and positioned adjacent said lifting means to intercept and contact the moving pans,
   a switch operated by said trigger means for generating an electrical signal when the pan strikes said trigger means, and
   control means responsive to said electrical signal for actuating said lifting means.

7. The apparatus as described in claim 6, wherein said trigger means further includes means for holding said trigger means downwardly out of the path of said moving pans to preclude actuation of said lifting means.

8. An apparatus for forming pan-carried dough pieces to produce bakery products of varying shape and design, comprising
   continuously moving conveyor means for transporting the pans carrying the dough pieces,
   forming means spaced from said conveyor means for allowing the pan-carried dough pieces to pass between said forming and conveyor means,
   lifting means for disengaging the pan from said moving conveyor means and lifting the dough pieces into intimate contact with said forming means, and
   actuator means adjacent said conveyor means for actuating said lifting means when the pan is aligned with said forming means.

9. The apparatus as described in claim 8, wherein said conveyor means comprises
   an elongated frame structure,
   a pair of spaced conveyor belts adapted for longitudinal movement with respect to said frame structure, said belts frictionally engaging the lower surface of opposite rims of the pans, and
   driving means for imparting movement to said spaced conveyor belts.

10. The apparatus as described in claim 9, wherein said driving means comprises
    a drive shaft disposed transversely to the longitudinal axis of said frame structure and adjacent one of its ends, said shaft adapted for rotational movement and having fixed thereon a pair of spaced rollers, each of said spaced rollers supporting and frictionally engaging one of said conveyor belts for imparting motion thereto as said drive shaft and rollers are rotated, an idler shaft disposed transversely to the longitudinal axis of said frame structure and adjacent its other end, said idler shaft adapted for rotational movement and having fixed thereon a pair of spaced rollers each of which frictionally engage and support one of said conveyor belts and rotate said idler shaft, and means for rotating said drive shaft.

11. The apparatus as described in claim 8, wherein said forming means comprises a plurality of shaped forming dies, and a frame adapted for attachment to said conveyor means for supporting said forming dies centrally adjacent said conveyor means and spaced overhead therefrom.

12. The apparatus as described in claim 8, wherein said lifting means comprises a lift plate adapted for vertical movement between said spaced conveyor belts for engaging the bottom of the pan carrying the dough pieces, and means for raising said lift plate to engage the bottom of the pan and carry the pan and dough pieces into forming contact with said forming means.

13. The apparatus as described in claim 12, wherein said means for raising said lift plate includes a source of pressurized fluid, a lift cylinder communicating with said fluid source and supported within said conveyor means, said cylinder having a piston shaft adapted for vertical movement, the end of said shaft being centrally attached to the lower surface of said lift plate, and a valve responsive to said actuator means for controlling the flow of said pressurized fluid into said lift cylinder for raising and lowering said piston shaft and said attached lift plate.

14. The apparatus as described in claim 8, wherein said actuator means comprises trigger means adapted for cooperating with said conveyor means to intercept the moving pans, a switch operated by said trigger means for generating an electrical signal when the pan strikes said trigger means, and control means responsive to said electrical signal for actuating said lifting means.

15. An apparatus for forming pan-carried dough pieces to produce bakery products of varying shape and design, comprising a rectangular box-frame structure, a pair of spaced conveyor belts, a pair of spaced support members having an L-shaped cross section disposed the length of said frame structure and fixed thereto, the extending horizontal side of each of said support members facing inwardly of said frame structure and supporting one of said spaced conveyor belts, a drive shaft disposed transversely to the longitudinal axis of said frame structure and adjacent one of its ends, said shaft adapted for rotational movement and having fixed thereon a pair of spaced rollers, each of said spaced rollers adapted for supporting and frictionally engaging one of said conveyor belts and imparting continuous motion thereto as said drive shaft and rollers are rotated, an idler shaft disposed transversely to the longitudinal axis of said frame structure and adjacent its other end, said idler shaft adapted for rotational movement and having fixed thereon a pair of spaced rollers each of which are adapted for frictionally engaging and supporting one of said moving conveyor belts, means for rotating said drive shaft, forming means positioned above said frame structure and conveyor belts for allowing the conveyor belt transported pans carrying the dough pieces to pass beneath said forming means, lifting means supported by said frame structure and disposed beneath said forming means for disengaging the pan from said moving conveyor belts and lifting the dough pieces into intimate contact with said forming means, and actuator means disposed within said frame structure for actuating said lifting means when the dough pieces are aligned beneath said forming means.

16. The apparatus as described in claim 15, wherein said forming means comprises a plurality of shaped forming dies, and a frame assembly adapted for central attachment to said frame structure for supporting said forming dies in a spaced overhead relationship to said conveyor belts.

17. The apparatus as described in claim 16, wherein said forming dies include a die head having forming blades projecting from one side of said head and a cylindrical sleeve axially projecting from the other side of said head, a stripping plate adapted for spring biased reciprocal movement with respect to said die head and forming blades, said stripping plate closely accommodating said forming blades removing dough scraps from the surfaces of the forming blades after the dough piece has been pressed into contact with said forming blades and stripper bar, a shank member having one end adapted for axial movement within said projecting cylindrical sleeve of said die head, the other end of said shank member being adapted for attachment to said frame assembly, and a compression spring disposed coaxially about said shank member, the ends of which contact said frame assembly and the upper end of said sleeve for permitting limited upward movement of said die head when contacted by the pan-carried dough pieces.

18. The apparatus as described in claim 15, wherein said lifting means comprises a source of pressurized air, a pneumatic lift cylinder communicating with said air source and supported within said frame structure, said cylinder being spaced below said plurality of said forming dies and having a piston shaft adapted for reciprocal vertical movement between said spaced conveyor belts, a lift plate fixed to the end of said piston shaft and adapted to engage the bottom of the pan for lifting the dough pieces upwardly into intimate forming contact with said plurality of forming dies, and a solenoid-actuated valve responsive to an electrical control signal generated by said actuator means for controlling the flow of said pressurized air into said lift cylinder to raise and lower said piston shaft and said lift plate.

19. The apparatus as described in claim 15, wherein said actuator means comprises trigger means disposed adjacent said lifting means and supported by said frame structure for intercepting and contacting the moving pans, a switch operated by said trigger means for generating an electrical signal when the pan strikes said trigger means, and control means responsive to said electrical signal for actuating said lifting means.

20. The apparatus as described in claim 19, wherein said trigger means comprises an elongated bar having first and second arms and mounted adjacent said lifting means, said bar adapted for limited pivotal movement with respect to said conveyor means, a pair of spaced plates fixed to said second arm and adjacent the outer edges thereof, said plates depending perpendicularly from said arm and mounting said switch therebetween, striker means attached adjacent the end of said second arm for engaging said moving pans and actuating said switch.

21. The apparatus as described in claim 20, wherein said trigger means further includes a shaft spaced adjacent said lifting means and mounted transversely within said frame structure, and a bar having an inverted V-shaped configuration and first and second arms, said first arm being adapted for pivotal movement about said shaft for maintaining said second arm in a substantially horizontal attitude.

22. The apparatus as described in claim 20, wherein said trigger means further includes a pneumatic cylinder having an extensible piston shaft mounted in a spaced relation to said first arm of said elongated bar and adapted for rotating said first arm upwardly and said striker means downwardly out of the path of said moving pans when said piston shaft is extended.

23. The apparatus as described in claim 20, wherein said striker means includes
- a rod mounted transversely between said depending side plates and adjacent the lower and forward edges thereof,
- a bar having one end adapted for pivotal movement about said rod and the other end adapted for engaging said moving pans and pivoting said bar inwardly and actuating said switch,
- a spring for pivotally biasing said bar away from said switch, and
- means for limiting the outward pivotal movement of said spring biased bar.

24. The apparatus as described in claim 20, wherein said trigger means further includes
- a plate adapted for limited sliding movement with respect to said shorter arm of said bar, one end of said plate extending past the end of said shorter arm and being adapted to engage the moving pans.
- at least one coil spring attached between the other end of said sliding plate and said sideplates for resisting the pan urged rearward movement of said sliding plate and returning said sliding plate to its outward extending position when the pan is lifted from engagement with said one end of said plate,
- said extended sliding plate contacting the bottom surface of the descending pan for pivoting said short arm of said bar downwardly about said shaft and preventing the pan from reengaging said striker means.

25. An apparatus for forming pan-carried malleable pieces to produce a product having a desired shape and design, comprising
- conveyor means for imparting movement to the pan-carried malleable pieces,
- forming means spaced adjacent said conveyor means,
- lifting means for raising the pan-carried malleable pieces free of said conveyor means and lifting said pieces into contact with said forming means, and
- trigger means for actuating said lifting means when the pan-carried malleable pieces are aligned with said forming means.

26. The apparatus as described in claim 25, wherein said conveyor means comprises
- an elongated frame structure,
- a pair of spaced conveyor belts adapted for longitudinal movement with respect to said frame structure, said belts frictionally engaging the lower surface of opposite rims of the pans, and
- driving means for imparting movement to said spaced conveyor belts.

27. The apparatus as described in claim 26, wherein said forming means comprises
- a plurality of shaped forming dies, and
- a frame adapted for attachment to said conveyor means for supporting said forming dies centrally adjacent said conveyor means and spaced overhead therefrom.

28. The apparatus as described in claim 27, wherein said lifting means comprises
- a lift plate adapted for vertical movement between said spaced conveyor belts for engaging the bottom of the pan carrying the malleable pieces, and
- means for raising said lift plate to engage the bottom of the pan and carry the pan and malleable pieces into forming contact with said forming means.

29. The apparatus as described in claim 28, wherein said actuator means comprises
- trigger means adapted for cooperating with said conveyor means to intercept the moving pans,
- a switch operated by said trigger means for generating an electrical signal when the pan strikes said trigger means, and
- control means responsive to said electrical signal for actuating said lifting means.

30. A method of forming pan-carried dough pieces to produce bakery products of varying shape and design, comprising
- transporting the pans carrying the dough pieces along a predetermined path that passes beneath an array of forming dies,
- detecting the moving pans when they are aligned beneath the array of forming dies,
- lifting the pan-carried dough pieces from said predetermined path into contact with said array of forming dies, and
- lowering the pan-carried dough pieces from contact with said array of forming dies to resume transportation along said predetermined path.

PO-1050
(5/69)

UNITED STATES PATENT OFFICE
CERTIFICATE OF CORRECTION

Patent No. 3,604,366      Dated September 14, 1971

Inventor(s) Earl K. Jarrett

It is certified that error appears in the above-identified patent and that said Letters Patent are hereby corrected as shown below:

Column 1, line 38; "conveyors" should be -- conveyor --;
    line 57, before "located" insert -- so --.
Column 2, line 44; delete second appearing "contact".
Column 4, line 11; before "cover" insert -- within --;
    line 48; after "belts" insert -- 34 --;
    line 71; "with" should be -- within --.
Column 5, line 7; delete "is";
    line 47; "suitably" should be -- suitable --.
Column 6, line 68; "of" should be -- or --.
Column 7, line 15; "restraining" should be -- retaining --;
    line 69; "suitably" should be -- suitable --.
Column 8, line 10; "arm" should be -- arms --;
    line 34; after "which" insert -- is --;

Column 9, line 11; "side" should be -- slide --;
    line 55; after "assembly" insert -- 65 --.
Column 11, line 37; before "continuously" insert -- means for --.
Column 12, line 2; "speed" should be -- spaced --.
Column 14, line 23; before "removing" insert -- for --;
    line 40; before "forming" delete "said".

Signed and sealed this 4th day of April 1972.

(SEAL)
Attest:

EDWARD M. FLETCHER, JR.          ROBERT GOTTSCHALK
Attesting Officer               Commissioner of Patents